Dec. 6, 1960  H. W. RIMBACH  2,963,610
FLUORESCENT LAMP AND METHOD
Filed May 26, 1958

INVENTOR.
HENRY. W. RIMBACH.
BY
W. D. Palmer
ATTORNEY.

2,963,610
FLUORESCENT LAMP AND METHOD

Henry W. Rimbach, Cedar Grove, N.J., assignor to Westinghouse Electric Corporation, East Pittsburgh, Pa., a corporation of Pennsylvania Filed May 26, 1958, Ser. No. 737,950

11 Claims. (Cl. 313—109)

This invention relates to fluorescent lamps and, more particularly, to a fluorescent lamp which will display improved lumen maintenance and to a method for obtaining such improved lumen maintenance.

The so-called lumen maintenance or maintenance of the light output of fluorescent lamps is an important factor in measuring the performance of such lamps. The light output of the usual fluorescent lamp will decrease something in the order of 4 to 5% during the first hundred hours of operation and after 600 hours of operation, the light output of an average lamp will have dropped approximately 7 to 8% from the zero-hour light output. Thereafter the light output drops somewhat more slowly. In the case of a 7500 hour lamp the total drop in light output at the end of life may be only 80% of the zero-hour light output.

It is the general object of this invention to avoid and overcome the foregoing and other difficulties of and objections to prior-art practices by the provision of a fluorescent lamp which has improved lumen maintenance.

It is another object to provide a method for improving the so-called lumen maintenance of a fluorescent lamp.

The aforesaid objects of the invention, and other objects which will become apparent as the description proceeds, are achieved by providing a method for treating the lehred vitreous envelope of a partially-fabricated fluorescent lamp, which envelope has the phosphor material already coated onto its interior surface. This lehred and phosphor-coated envelope is treated by flushing a solvent material preferably comprising water through the interior of the envelope so that substantially all of the coated phosphor material is contacted by the water flush while leaving the coated phosphor undisturbed. Thereafter the flushed envelope and coated phosphor material are dried in an atmosphere which is substantially free from gases deleterious to lamp performance. A fluorescent lamp fabricated from such a treated phosphor-coated envelope will include a minimum of water-soluble sodium salts and will display an improved lumen maintenance.

For a better understanding of the invention, reference should be had to the accompanying drawing wherein.

Although the principles of the invention are applicable to any type of fluorescent lamp, the most common type of fluorescent lamp is the 40 w. T12 and hence this type of lamp will be considered in detail.

Figure 1:
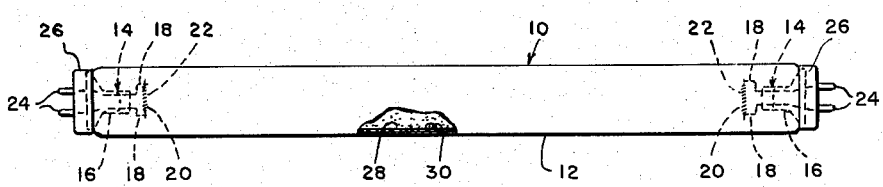
Fig. 1 is an elevational view, partly in section, of a fluorescent lamp incorporating a phosphor-coated envelope treated in accordance with the present method.

With specific reference to the form of the invention illustrated in the drawing, the numeral 10 in Fig. 1 illustrates generally a 40 w. T12-type fluorescent lamp comprising a tubular vitreous envelope 12 which is normally fabricated of the usual soda-lime-silica glass, having mounts 14 sealed into either end thereof as is customary. Each mount comprises a vitreous portion 16 sealed to the end of the envelope 12 with lead conductors 18 sealed therethrough and supporting at their inwardly-extending extremities refractory metal coils 20, which are fabricated of tungsten for example. These coils are normally of a coiled-coil construction or of a triple-coil construction, such constructions being well known, and contained within the turns of the inner coil or coils is a filling of electron-emitting material 22. Such electron-emitting materials are well known and normally comprise a mixture of alkaline earth oxides which may have other materials such as zirconia added thereto. As a specific example, the electron-emitting material comprises a mixture of 60% by weight of barium oxide, 30% by weight calcium oxide and 10% by weight strontium oxide and the electron-emitting material may have an additive such as 0.9% by weight of zirconia, if desired. This specific electron-emitting material is given only by way of example and many other mixtures of alkaline-earth materials or even single alkaline-earth materials or other types of electron-emitting materials can be used if desired, as is well known. Electrical connection for the lead conductors 18 is normally effected by contact pins 24 which project from the supporting base caps 26 at either end of the lamp. The envelope 12 has coated on its interior surface a phosphor material 28, which in accordance with this invention has been processed after the envelope has been lehred in a manner as will be described hereinafter. The envelope also contains a small filling of argon or other inert, ionizable gas at a pressure of about 4 millimeters, for example, in order to facilitate starting, although other starting gas fill pressures can be used, as is well known. Also contained within the envelope is a small charge of mercury 30, as is customary. In the operation of such a lamp, the phosphor responds to the 2537 A.U. resonant radiation of the mercury discharge to produce longer wavelength radiations, as is well known.

The vitreous envelope 12 for the usual fluorescent lamp is fabricated from the so-called soda-lime-silica glass, a representative batch of which analyzes as follows: 72.8% silica, 16.5% sodium oxide, 0.59% potassium oxide, 4.98% calcium oxide, 3.5% magnesium oxide, 1.23% $R_2O_3$ (alumina, antimony and iron oxides for example) and 0.14% arsenic trioxide. This foregoing formulation is given only by way of example and it can be varied considerably. The usual fluorescent lamp envelope, however, will contain appreciable alkali metal oxide, normally sodium oxide, with the proportions of other alkali metal oxides being comparatively small as compared to the sodium oxide.

The most usual phosphor material as used in a fluorescent lamp is categorized as a halophosphate phosphor. Halophosphate phosphor materials described in U.S. Patent No. 2,488,733, dated November 22, 1949, are generally analogous to the natural mineral apatite and will display substantially the same X-ray diffraction pattern as this mineral. These halophosphate phosphor materials can be represented by the matrix $$3M_3(PO_4)_2 \cdot 1M'L_2$$

where L represents a halogen or mixture of halogens and M and M' represent either different or identical bivalent metals or mixtures of such metals. In practice, the primary constitutent for most halophosphate phosphors is calcium orthophosphate although strontium orthophosphate is used in some limited cases. The halide constituent normally comprises calcium chloride or fluoride or strontium chloride or fluoride or mixtures of both and the activator materials are normally antimony or antimony plus manganese.

The details for preparing halophosphate phosphors are generally well known and the raw-mix constituents comprising the prosphor are normally thoroughly mixed or blended and then fired, preferably in covered crucibles, at tempertures which can vary from about 1100° C. to about 1260° C. for example, with the maximum firing temperature being determined by the hardness of the resulting fired batch.

As a first specific example, 583 grams of calcium oxide are admixed with 538 grams of phosphorus pentoxide, 10.17 grams manganous carbonate, 31 grams antimony trioxide, 48 grams strontium chloride and 77.3 grams calcium fluoride. This admixture is fired at a temperature of about 1185° C. for a period of three hours to produce what is known as a 4500° K. halophosphate phosphor. As a second example, 63.6 grams calcium oxide, 54.4 grams phosphorus pentoxide, 1.48 grams antimony trioxide and 8.92 grams calcium fluoride are admixed and fired in a covered crucible at a temperature of about 1180° C., for example, to produce a blue halophosphate phosphor. As a third example, 569 grams calcium oxide, 538 grams phosphorus pentoxide, 21.5 grams manganous carbonate, 31 grams antimony trioxide, 48 grams strontium chloride and 77.3 grams calcium fluoride are admixed and fired at a temperature of about 1190° C. for about two and one-half hours to produce what is known as a warm-white halophosphate phosphor. As a fourth example, 569 grams calcium oxide, 538 grams phosphorus pentoxide, 16.25 grams manganous carbonate, 31 grams antimony trioxide, 48 grams strontium chloride and 77.3 grams calcium fluoride are admixed and fired at about 1130° C. for about three hours to produce what is known in the art as a 3500° K. halophosphate.

The four examples given hereinbefore cover a wide range of halophosphate phosphor materials and any of these examples can be utilized in a fluorescent lamp envelope treated in accordance with the method as described hereinafter. It should be understood that the following method applies to any halophosphate phosphor material and any of the specific examples as given in the beforementioned U.S. Patent No. 2,488,733 can also be treated by the instant method with similar beneficial results.

The present method is also applicable to phosphor materials other than halophosphates as are used in fluorescent lamps, such as the well-known zinc silicate activated by manganese and the method can also be used with beneficial results in conjunction with an erythemal phosphor, such as described in U.S. Patent No. 2,563,900, dated August 14, 1951. Blends of any of the foregoing visible-light-emitting phosphors can be used, as is customary. While numerous examples of suitable phosphors have been given, the present method as described hereinafter will provide beneficial results in conjunction with any phosphor as used in conjunction with a phosphor-coated, low pressure, positive-column discharge device, such a device being generally known as a fluorescent lamp.

The first step in the actual manufacture of a fluorescent lamp is to coat the sodium-containing vitreous envelope with the phosphor material and such a coating is effected by means of what is known in the art as a phosphor "paint." For example, any of the foregoing phosphor materials are mixed with a vehicle such as butyl acetate and a small amount of binder material such as nitrocellulose to form the paint. By way of further detail, 200 kilograms of the foregoing 4500° K. halophosphate phosphor material are admixed with 75 liters of butyl acetate and 25 liters of butyl acetate having included therewith 2% by weight of nitrocellulose, with the 25 liters of butyl acetate and nitrocellulose having a No. 7 Parlin cup viscosity of 65–75 seconds. The phosphor-vehicle admixture is pebble milled to form a homogeneous suspension or so-called "paint" including the very finely-divided phosphor material and this paint can be further thinned if desired. The paint is the flushed over the inside of a fluorescent envelope to coat same, after which the nitrocellulose binder is volatilizing by lehring the coated envelope at a temperature of about 655° C., for a period of two or three minutes, for example. The purpose of the lehring operation is to volatilize the binder material from the phosphor by converting same to carbon dioxide and water and this volatilized material is driven from the envelope.

Many fluorescent lamps show a deposition of mercury on the phosphor coating and this mercury deposition is associated with poor lumen maintenance. The mercury deposition often appears as a fine haze which frequently covers the phosphor so uniformly as to pass unnoticed. At other times, the mercury deposition takes the form of streaks, bands or irregular areas which slowly evaporate from the phosphor coating when the lamp is broken open and exposed to the atmosphere at a temperature of about 90 to 100° F.

Figure 2:
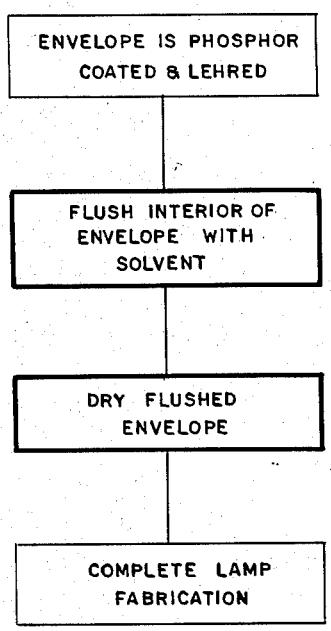
Fig. 2 is a flow chart illustrating the method for treating phosphor-coated fluorescent lamp envelopes so as to improve the lumen maintenance of the completed lamp.

To inhibit the formation of any substantial amounts of mercury film on the phosphor in order to improve the lumen maintenance for the lamp, it has been found that the phosphor-coated and lehred fluorescent tube can be washed with a solvent after the lamp is removed from the lehr, in accordance with the flow diagram as shown in Fig. 2. The preferred washing solvent is hot distilled water and the washing is conducted so that the water contacts at least substantially all of the coated phosphor particles as it passes through the envelope, while leaving the coated phosphor substantially in situ on the interior surface of the envelope. By causing the water wash to contact substantially all of the coated phosphor material, the inner surface of the vitreous envelope will also be contacted by the water comprising the wash. As a specific example, for washing a phosphor-coated envelope intended for use with a 40 w. T12 fluorescent lamp, distilled water is poured into the envelope which is tilted from the horizontal at an angle of sixty degrees. The water is desirably heated to a temperature of 120° F., for example, and is poured from a beaker through the envelope at a rate of 500 cc. per minute while the envelope is rotated at a rate of two r.p.m. Such a washing procedure is continued until approximately 500 cc. of hot water have been flushed through the envelope. Thereafter the flushed envelope and coated phosphor material are dried in an atmosphere which is substantially free from any gases deleterious to lamp performance and as an example, the coated envelope is dried for 5 to 10 minutes in an air atmosphere heated to a temperature of 160° F. The foregoing specific washing procedure is subject to considerable variation. The coated phosphor material adheres surprisingly well to the interior surface of the envelope and substantially no phosphor is removed by the water wash.

After the envelope has been washed and dried, the fluorescent lamp is completed in accordance with the usual procedures which include sealing the mounts 14 into either end of the lamp envelope 12, exhausting the envelope, treating the electrodes, again exhausting, inserting a starting gas and mercury charge, tipping off the tubulation and thereafter affixing the base caps to the end of the envelope, such procedures being customary in the art.

Apparently the present washing procedure acts to remove an appreciable portion of sodium salts which are present either on the inside surface of the envelope or admixed with the phosphor material, or both. When the lamp is lehred in the manner as indicated hereinbefore, sodium is driven from the envelope to the interior surface of the envelope where such sodium apparently reacts with impurity gases which are contained within the lehring atmosphere. The most deleterious of these impurity gases has been found to be sulphur dioxide which is normally present in limited amounts and apparently the sodium reacts with the sulphur dioxide to form small quantities of sodium sulphate within the interior of the lamp envelope. Sodium sulphate constitutes a getter material for mercury and apparently causes the mercury film to be formed in the manner as indicated hereinbefore.

A series of analyses was obtained with respect to impurities which were removed by the present washing method from the interior surfaces of the lamp envelope and from the phosphor coating. These analyses disclosed approximately 1.0–1.5 milligrams per 40 w. T12-type envelope of total solids content of which about 95% were sodium salts. One of most prevalent of the sodium salts was sodium sulphate and other sodium salts present were the phosphate and carbonate and to a much lesser amount the chloride and antimonate. To test the deleterious effect of the sodium sulphate, an equivalent amount was deliberately placed back into the fluorescent lamp envelope. This resulted in a deleterious effect on lumen maintenance and the resulting maintenance was approximately equivalent to that obtained with lamps which were not treated in accordance with the instant method. The other indicated sodium salts were also deliberately added to the lamp, but their deleterious effect on lumen maintenance was much less pronounced than the deleterious effect of sodium sulphate.

In testing the beneficial effects on lumen maintenance realized from the present washing method, a large group of lamp envelopes were coated with the foregoing 4500° K. halophosphate phosphor material and were lehred in the usual manner to volatilize the binder. Thereafter a control portion of these envelopes were made into fluorescent lamps in accordance with the usual procedures. The remaining coated envelopes were washed with a single wash in the manner as specified hereinbefore. These washed envelopes were then fabricated into fluorescent lamps by the usual procedures. The zero-hour output readings for the control and washed lamps were approximately the same. The 100-hour-output readings for the control lamps averaged 96% of zero-hour output and the 100-hour-output readings for the lamps for which the phosphor-coated envelopes had been processed by the water washing averaged approximately 97.5% of zero-hour output. For this specific phosphor, this represented a lumen gain averaging about 40 lumens after 100 hours operation. After 600 hours of operation, the output reading for the lamps fabricated from the envelopes which had been washed averaged 95% of zero-hour output and after 600 hours operation, the lumen maintenance of the control lamps averaged approximately 92.5% of zero-hour output. This represents an increase averaging about 65 lumens after 600 hours operation. The increase in output, as expressed in lumens, will vary according to the zero-hour lumen output of the lamp, but the foregoing maintenance figures as expressed in percentage of zero-hour output are representative of the lumen maintenance improvement which is achieved through the washing method as specified. Throughout their rated life the lamps fabricated from the washed envelopes continued to show an equivalent improvement in lumen maintenance.

Not all of the sodium sulphate need be removed from the washed coating and apparently about 50% of the sodium salts which are present are removed by the specific washing technique as outlined hereinbefore. In control tests, coated lamp envelopes were washed and rewashed until substantially all water-soluble material was washed from the interior of the envelope. The quantity of residual sodium salts removed by the multiple washing, after the single initial washing as outlined hereinbefore, was almost as great as the quantity of sodium salts removed from the lamp envelope during the initial single washing step. As a general rule, a 40 w. T12-type lehred and unwashed envelope will have in the phosphor or on the envelope interior surface, or both, from 2.5 to 3.5 milligrams of water-soluble sodium salts. After a single wash in the manner as described hereinbefore, there will normally be included within the interior of the lamp envelope from about 1.0 to about 1.3 milligrams of these salts. Apparently this lesser amount of residual sodium salts present after the initial washing are not particularly deleterious to lamp performance, although they can be removed by repeated washings if desired.

The interior surface area of a 40 w. T12-type envelope is approximately 1340 sq. cm. After the single washing step as outlined hereinbefore, slightly less than about 0.001 mg. per sq. cm. of envelope interior surface of residual water-soluble sodium salts will remain within the interior of the envelope. Apparently this amount of residual water-soluble sodium salts can be tolerated without appreciably affecting the lumen maintenance of the finished lamp. While this example has been given for a 40 w. T12-type of envelope since it is the most common, for any other type of fluorescent lamp to display an improved lumen maintenance through a washing of the coated and lehred envelope, the interior surface of the envelope and the phosphor material included thereon should include or contain less than about 0.001 mg. per square centimeter of envelope interior surface of water-soluble sodium salt.

In the event the lamp envelopes are relehred for any reason, they should be rewashed in a manner as specified hereinbefore, inasmuch as any intensive relehring will again drive sodium from within the vitreous envelope to the inner surface of the envelope where such sodium can react with the impurity gases contained within the lehring atmosphere to form the undesirable sodium salts, and particularly sodium sulphate. In control tests, washed envelopes were deliberately relehred and then not rewashed and the average lumen maintenance of the fluorescent lamps fabricated from these control envelopes was equivalent to that of an unwashed envelope.

The preferred washing solvent is hot distilled water since the solubility of the sodium salts is greater in hot water, although cold or room-temperature distilled water can be used if desired. In addition, other solvents can be added to the water such as glycerine, for example, in order to increase the effectiveness of the wash in removing the soluble sodium salts. In the case of glycerine, the envelope should be dried at relatively high temperatures such as about 300° C. in order to volatilize any residual glycerine. This temperature is not sufficient to cause any appreciable additional amount of sodium to migrate from the envelope to the envelope inner surfaces and to the coated phosphor.

When drying the flushed envelope and coated phosphor material, the drying atmosphere should be maintained as free as possible from any gases which are deleterious to lamp performance and one example of such a deleterious gas is sulphur dioxide. Normally warm air at a temperature of 160° F. will be suitable for drying the lamp envelope, although inert gases such as nitrogen could be used if desired.

It will be recognized that the objects of the invention have been achieved by providing a fluorescent lamp having improved lumen maintenance as well as a method for treating a fluorescent lamp envelope whereby the lumen maintenance of the resulting lamp is improved.

As a possible alternative embodiment, the present method can be utilized with fluorescent lamp envelopes which are fabricated from vitreous materials which do not include alkali metals, such as quartz or Vycor. The undesirable sodium salts will normally not be present where such envelopes are used, but may be introduced through the lehring atmosphere. In such a case, the present washing procedure will act to improve the lumen maintenance of these lamps.

The present method also is effective in removing other alkali salts such as potassium sulphate although potassium is normally present as a constituent in the vitreous envelope in very small amounts. Thus the present washing method is not necessarily limited to removing sodium sulphate, but is applicable to removing from the inner surface of the vitreous envelope and the coated phosphor any impurity which has an affinity for mercury.

It is also possible to use solvents other than water and any material which is a solvent for the impurity present which has an affinity for mercury can be utilized, a specific example being glycerine which is a solvent for sodium sulphate.

While one best embodiment has been illustrated and described in detail, it is to be particularly understood that the invention is not limited thereto or thereby.

I claim:

1. The method of treating the lehred and sodium-containing vitreous envelope of a partially-fabricated fluorescent lamp which envelope has phosphor material coated on its interior surface, which method comprises flushing a solvent consisting essentially of water through the interior of said envelope in such a manner that said water flush contacts substantially all of said coated phosphor material while leaving said coated phosphor material substantially in situ on the interior surface of said envelope, and drying said flushed envelope and said coated phosphor material in an atmosphere which is substantially free from gases deleterious to lamp performance, whereby a completed fluorescent lamp incorporating such treated envelope displays improved maintenance.

2. The method of treating the lehred and sodium-containing vitreous envelope of a partially-fabricated fluorescent lamp which envelope has phosphor material coated on its interior surface, which method comprises flushing a solvent consisting essentially of hot water through the interior of said envelope in such a manner that said water flush contacts substantially all of said coated phosphor material while leaving said coated phosphor material substantially in situ on the interior surface of said envelope, and drying said flushed envelope and said coated phosphor material in an atmosphere which is substantially free from gases deleterious to lamp performance, whereby a completed fluorescent lamp incorporating such treated envelope displays improved lumen maintenance.

3. The method of treating the lehred and sodium-containing vitreous envelope of a partially-fabricated fluorescent lamp which envelope has phosphor material coated on its interior surface, which method comprises flushing distilled water through the interior of said envelope in such a manner that said water flush contacts substantially all of said coated phosphor material while leaving said coated phosphor material substantially in situ on the interior surface of said envelope, and drying said flushed envelope and said coated phosphor material in an atmosphere which is substantially free from gases deleterious to lamp performance, whereby a completed fluorescent lamp incorporating such treated envelope displays improved lumen maintenance.

4. The method of treating the lehred and sodium-containing vitreous envelope of a partially-fabricated fluorescent lamp which envelope has phosphor material comprising halophosphate phosphor coated on its interior surface, which method comprises flushing a solvent consisting essentially of water through the interior of said envelope in such a manner that said water flush contacts substantially all of said coated phosphor material while leaving said coated phosphor material substantially in situ on the interior surface of said envelope, and drying said flushed envelope and said coated phosphor material in an atmosphere which is substantially free from gases deleterious to lamp performance, whereby a completed fluorescent lamp incorporating such treated envelope displays improved lumen maintenance.

5. The method of treating the vitreous envelope of a partially-completed fluorescent lamp having coated phosphor material and appreciable impurity sodium salts included on its interior surface, comprising flushing a solvent for said impurity sodium salts through the interior of said envelope in such a manner that said solvent flush contacts substantially all of said coated phosphor material while leaving said coated phosphor material substantially in situ on the interior surface of said envelope, and drying said flushed envelope and said coated phosphor material in an atmosphere which is substantially free from gases deleterious to lamp performance, whereby a completed fluorescent lamp incorporating such treated envelope displays improved lumen maintenance.

6. The method of treating the vitreous envelope of a partially-completed fluorescent lamp having coated phosphor material and appreciable water-soluble impurity sodium salts included on its interior surface, comprising flushing a solvent consisting essentially of water through the interior of said envelope in such a manner that said water flush contacts substantially all of said coated phosphor material while leaving said coated phosphor material substantially in situ on the interior surface of said envelope, and drying said flushed envelope and said coated phosphor material in an atmosphere which is substantially free from gases deleterious to lamp performance, whereby a completed fluorescent lamp incorporating such treated envelope displays improved lumen maintenance.

7. The method of treating the vitreous envelope of a partially-completed fluorescent lamp having coated phosphor material and appreciable water-soluble impurity sodium salts included on its interior surface, comprising flushing hot distilled water through the interior of said envelope in such a manner that said water flush contacts substantially all of said coated phosphor material while leaving said coated phosphor material substantially in situ on the interior surface of said envelope, and drying said flushed envelope and said coated phosphor material in an atmosphere which is substantially free from gases deleterious to lamp performance, whereby a completed fluorescent lamp incorporating such treated envelope displays improved lumen maintenance.

8. The method of treating the vitreous envelope of a partially-fabricated fluorescent lamp having coated phosphor material and impurity having an affinity for mercury included on its interior surface, comprising flushing a solvent for said impurity through the interior of said envelope in such a manner that said solvent flush contacts substantially all of said coated phosphor material while leaving said coated phosphor material substantially in situ on the interior surface of said envelope, and drying said flushed envelope and coated phosphor material in an atmosphere which is substantially free from gases deleterious to lamp performance, whereby a completed fluorescent lamp incorporating such treated envelope displays improved lumen maintenance.

9. A fluorescent lamp comprising, a sealed tubular sodium-containing vitreous envelope, phosphor material coated on the interior surface of said envelope, electrodes operatively disposed in either end of said envelope and an inert ionizable starting gas and a charge of mercury included within said envelope, said envelope having been lehred during lamp fabrication after said phosphor material is coated, and the interior surface of said envelope and said phosphor material coated thereon including less than about 0.001 mg. per square centimeter of envelope interior surface of water-soluble sodium salt.

10. A fluorescent lamp comprising, a sealed tubular sodium-containing vitreous envelope, phosphor material coated on the interior surface of said envelope, electrodes operatively disposed in either end of said envelope and an inert ionizable starting gas and a charge of mercury included within said envelope, said envelope having been lehred during lamp fabrication after said phosphor material is coated, and the interior surface of said envelope and said phosphor material coated thereon including less than about 0.001 mg. per square centimeter of envelope interior surface of water-soluble sodium salt comprising sodium sulphate.

11. The method of treating the lehred vitreous envelope of a partially-completed fluorescent lamp having coated phosphor material and appreciable water-soluble impurity sodium salts on its interior surface, which method comprises, flushing hot distilled water through the interior of said envelope in such manner that the water flush contacts substantially all of said coated phosphor material while leaving said coated phosphor material substantially in situ on the interior surface of said envelope, and drying said flushed envelope and said coated phosphor material in an air atmosphere.

References Cited in the file of this patent

UNITED STATES PATENTS

| | | |
|---|---|---|
| 2,621,997 | Benes | Dec. 16, 1952 |
| 2,678,888 | Evans | May 18, 1954 |
| 2,691,601 | Butler | Oct. 12, 1954 |
| 2,709,644 | Gustin | May 30, 1955 |
| 2,748,306 | Bjorkman | May 29, 1956 |
| 2,774,682 | Larach | Dec. 18, 1956 |
| 2,795,514 | Hoshowsky | June 11, 1957 |
| 2,802,129 | Meister et al. | Aug. 6, 1957 |